United States Patent Office 3,520,955
Patented July 21, 1970

3,520,955
POLYETHYLENE-LIKE POLYMER WITH BACK-
BONE TRANS-UNSATURATION AND METHOD
OF PREPARING BY CRACKING ETHYLENE-
VINYL ACETATE
Ronald E. Gilbert, Shawnee Mission and Bert H.
Clampitt, Overland Park, Kans., and Harry D.
Anspon, Sewickley, Pa., assignors to Gulf Research
& Development Company, Pittsburgh, Pa., a cor-
poration of Delaware
No Drawing. Filed Aug. 26, 1968, Ser. No. 755,449
Int. Cl. C08f 29/12, 37/18, 41/12
U.S. Cl. 260—897                                    5 Claims

ABSTRACT OF THE DISCLOSURE

Ethylene-vinyl acetate copolymers may be thermally cracked at the vinyl acetate position in the polymer chain. Acetic acid is removed leaving predominately trans carbon to carbon unsaturation along the polymer backbone. In order to achieve the results above, the reaction must be carried out in an inert atmosphere. The cracked polymer is blended in minor proportions with polyethylene to yield compositions with improved transparency, particularly in the form of extruded polyethylene film.

BACKGROUND OF INVENTION

This invention relates to a polyethylene-like polymer containing predominately trans carbon to carbon double bond unsaturation along the polymer backbone chain, and the method of preparing this polymer by cracking an ethylene-vinyl acetate copolymer in an inert atmosphere.

Cracking of ethylene-vinyl acetate copolymers in the presence of oxygen is known in U.S. Pat. 2,372,001. However, the process degrades the polymers described to a wax like product. There is no previously known way to introduce random, controlled, trans unsaturation along a polyethylene polymer backbone.

SUMMARY

It has been found that a polyethylene-like polymer containing predominately trans carbon to carbon double bond unsaturation along the polymer backbone chain can be prepared by subjecting an ethylene-vinyl acetate copolymer to a temperature from about 275° C. to about 400° C. in an inert atmosphere. The ethylene-vinyl acetate copolymer is cracked to acetic acid and a polyethylene-like polymer containing predominantly trans carbon to carbon double bond unsaturation.

This resulting polyethylene-like polymer is useful for most of the same uses as polyethylene polymers. For example, as film for packaging, and as molded articles useful as containers and the like.

This polyethylene-like polymer has been found particularly useful as an additive to improve the optical properties of conventional polyethylene film.

By the method of this invention trans unsaturation can be introduced on the polymer backbone in a random, yet controlled manner. By using a highly uniform ethylene-vinyl acetate copolymer the trans unsaturation can be introduced in a highly uniform manner.

PREFERRED EMBODIMENTS

Thermocracking of ethylene-vinyl acetate copolymers was carried out both batchwise and continuously. The batchwise reaction was carried out in an inert atmosphere (oxygen exclusion is necessary) at a programmed linear temperature rate of 6° C. per minute. The desired cracking reaction occurs from approximately 275° C. with an increasing reaction rate to 400° C. The polymer residue can be held at 400° C. for a short period of time (several minutes) without crosslinking or degrading. For example, the desired product results when the copolymer is held at 275° C. for about one hour to about eight hours, but at 400° C. the range is only about 0.5 minute to ten minutes. The amount of acetic acid removal and the remaining unsaturation are equivalent to the vinyl acetate content of the copolymer.

The continuous reaction was carried out by pumping the molten copolymer through a one fourth inch by five foot stainless steel tube heated to 400° C. in a fused salt bath. A Brabender Plastigraph extruder was used as a copolymer pump. The cracked material was quenched in a water bath at the exit of the reaction tube and then cut into pellets. The reaction data are listed in the following tables. The product analysis is listed from material prepared by the continuous process. The batchwise reaction product appears to be identical with the continuous reaction product. Atmospheric oxygen exclusion is necessary to prevent the oxidation of the cracked product. The presence of oxygen causes extreme degradation of the cracked product to low · molecular weight waxes and grease.

TABLE I.—CONTINUOUS CRACKING OF ETHYLENE-VINYL ACETATE COPOLYMER

| | Run No. 1 | Run No. 2 |
|---|---|---|
| Extruder r.p.m. | 40 | 40 |
| Reactor length, ft. | 5 | 5 |
| Reaction temperature, ° C. | 400 | 400 |
| Extruder temperature, ° C.: | | |
| Zone 1 | 115 | 120 |
| Zone 2 | 150 | 150 |
| Zone 3 | 200 | 200 |
| Product, grams/min. | 15.1 | 15.0 |
| Residence time, min. | 1.66 | 1.66 |
| Percent vinylacetate: | | |
| In feed | 3.15 | 3.52 |
| In product | 0.30 | 0.20 |
| Percent conversion | 90.5 | 94.3 |
| Unsaturation, $C=C/1{,}000C$ by infrared analysis | 4.8 | 4.7 |
| Calculated $C=C/1{,}000C$ | 4.7 | 5.5 |

TABLE Ia.—PRODUCT ANALYSIS
[Unsaturation per 1,000 carbon atoms]

| | Trans | Vinyl | Vinylidene | Total |
|---|---|---|---|---|
| Run No.: | | | | |
| 1 | 4.09 | 0.41 | 0.34 | 4.84 |
| 2 | 3.97 | 0.42 | 0.35 | 4.74 |

| | Ethylene-vinyl acetate copolymer containing 3.15% by weight vinyl acetate | | Ethylene-vinyl acetate copolymer containing 3.52% by weight vinyl acetate | |
|---|---|---|---|---|
| | Original | Cracked | Original | Cracked |
| Melt index | 0.997 | 32 | 0.902 | 36 |
| Relative viscosity [1] | 1.16 | 1.13 | 1.16 | 1.10 |

[1] p-Xylene at 100° C.

The polyethylene-like polymer prepared in run 2 was added to film grade polyethylene resin containing conventional slip and anti-block additives in the amounts shown in Table II. The test resins and the two control resins were produced on a conventional blown film extruded and analyzed at the same time. The overall film properties, shown in Table III, are improved when the product from run 2 is added. The haze and gloss are greatly improved over the control resins, while all other properties seem to be unaffected. In addition to the properties shown in Table III the physical properties such as tensile strength, elongation, block, coefficient of friction, impact strength, heat seal properties, and printability were substantially the same as control samples.

TABLE II.—RECIPES FOR FILM RESINS

| Sample | Base resin | Product from Run 2, parts per million |
|---|---|---|
| 1 | A | None |
| 2 | A | 1,000 |
| 3 | A | 2,000 |
| 4 | A | 5,000 |
| 5 | B | None |
| 6 | B | 10,000 |

TABLE III.—FILM PROPERTIES

| Test | ASTM Number | Sample Number | | | | | |
|---|---|---|---|---|---|---|---|
| | | 1 | 2 | 3 | 4 | 5 | 6 |
| Haze, percent | D-1003 59T | 5.0 | 3.3 | 3.4 | 3.4 | 5.1 | 3.5 |
| Gloss, 60° | D-523 62T | 133.5 | 154.7 | 151.4 | 152.0 | 134.3 | 149.7 |
| Scattermaster, percent maximum | D-1764 62T | 64.8 | 61.2 | 62.3 | 63.3 | 67.2 | 65.2 |
| Scattermaster, percent minimum | D-1764 62T | 69.8 | 67.5 | 68.0 | 68.5 | 72.5 | 71.8 |
| Melt index, gm./10 minutes | D-1238 27 | 1.40 | 1.36 | 1.35 | 1.34 | 2.03 | 2.12 |
| Density | D-1505 60T | 0.9246 | 0.9244 | 0.9245 | 0.9245 | 0.9272 | 0.9271 |

The vinyl acetate content of the polymer may be varied over a wide range with corresponding variation in carbon to carbon unsaturation groups along the polyethylene-like polymer. The polyethylene-like polymer of this type most useful to improve optical properties of polyethylene film contains about 0.05 to about 200, and preferably about 0.8 to about 75 predominantly trans carbon to carbon double bonds per 1000 carbon atoms. To improve the optical properties of polyethylene film as little as one part per million and as great as one hundred thousand parts per million may be added to the polyethylene film. However, about five hundred to about ten thousand parts per million are preferred. The ethylene-vinyl acetate copolymer can be partially cracked so that the resulting product is a copolymer of ethylene and vinyl acetate partially cracked so as to have predominantly trans carbon to carbon double bonds along the polymer backbone chain. This partially cracked polymer is also useful to improve the optical properties of polyethylene film.

In the method of preparing this polyethylene-like polymer, the vinyl acetate content of the polymer may be as great or as small as can be prepared in the prior art method for preparing ethylene-vinyl acetate copolymers. For example, copolymers containing about 0.1 to about 67.5 percent by weight can be used. However, the preferred copolymer contains about 0.5 to about 35 percent by weight vinyl acetate comonomer.

We claim:
1. A composition of polyethylene containing minor amounts of a polyethylene-like polymer containing predominantly trans carbon to carbon double bond unsaturation along the polymer backbone chain which is prepared by subjecting an ethylene-vinyl acetate copolymer containing about 0.5 to 35 percent by weight vinyl acetate comonomer to a temperature of from about 275° C. to about 400° C. in an inert atmosphere for a time range varying with temperature of from about one hour to about eight hours at 275° C. to from about 0.5 to about 10 minutes at 400° C. thereby cracking said ethylene-vinyl acetate copolymer to acetic acid, said polyethylene-like polymer containing about 0.8 to about 75 trans carbon to carbon double bonds per 1000 carbon atoms.

2. The composition of claim 1 wherein the minor amount of polyethylene-like polymer containing predominantly trans carbon to carbon double bonds unsaturation is about 1 to about 100,000 parts per million.

3. The composition of claim 1 wherein the minor amount of polyethylene-like polymer containing predominantly trans carbon to carbon double bond unsaturation is about 500 to about 10,000 parts per million.

4. A method of manufacturing polyethylene film of improved transparency comprising the steps:
(a) preparing a polyethylene-like polymer containing predominantly trans carbon to carbon double bond unsaturation along with polymer backbone chain by subjecting an ethylene-vinyl acetate copolymer containing about 0.5 to 35 percent by weight vinyl acetate comonomer to a temperature from about 275° C. to about 400° C. in an inert atmosphere for a time range varying with temperature of from about one hour to about eight hours at 275° C. to from about 0.5 to about 10 minutes at 400° C. thereby cracking said ethylene-vinyl acetate copolymer to acetic acid and said polyethylene-like copolymer containing about 0.8 to about 75 trans carbon to carbon double bonds per 1000 carbon atoms,
(b) mixing a minor amount of the polyethylene-like polymer produced in step (a) with polyethylene in the proportion of from about 500 to about 10,000 parts per million, and
(c) extruding the mixture of step (b) to yield a polyethylene film of improved transparency.

5. The method of claim 4 wherein the cracking is a continuous reaction carried out by passing said copolymer through a stainless steel tube which is heated along an upstream portion to a temperature of from about 275° C. to about 400° C. then cooled at the exit of said tube to a temperature below the melting point of said polyethylene-like polymer containing predominantly trans carbon to carbon double bond unsaturation.

References Cited

UNITED STATES PATENTS

| 2,372,001 | 3/1945 | Joyce | 260—86 |
| 2,388,169 | 10/1945 | McAlevy et al. | 260—79 |
| 3,226,455 | 12/1965 | Matsubayashi et al. | 260—897 |
| 3,248,359 | 4/1966 | Maloney | 260—41 |
| 3,426,107 | 2/1969 | Scruggs et al. | 260—897 |

JOSEPH L. SCHOFER, Primary Examiner

J. C. HAIGHT, Assistant Examiner

U.S. Cl. X.R.

260—87.3